(12) United States Patent
Joe et al.

(10) Patent No.: US 7,766,107 B2
(45) Date of Patent: Aug. 3, 2010

(54) ENGINE STARTING CONTROL DEVICE FOR A HYBRID VEHICLE

(75) Inventors: Shinichiro Joe, Yokohama (JP); Tadashi Okuda, Hadano (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 911 days.

(21) Appl. No.: 11/516,835

(22) Filed: Sep. 7, 2006

(65) Prior Publication Data

US 2007/0056783 A1  Mar. 15, 2007

(30) Foreign Application Priority Data

Sep. 8, 2005  (JP)  ............... 2005-260028

(51) Int. Cl.
*B60K 6/00* (2007.10)

(52) U.S. Cl. ............... 180/65.21; 180/65.265; 180/65.28

(58) Field of Classification Search ............ 180/65.21, 180/65.25, 65.26, 65.31, 65.6
See application file for complete search history.

(56) References Cited

U.S. PATENT DOCUMENTS

| 5,558,175 | A | * | 9/1996 | Sherman | ................. | 180/65.25 |
|---|---|---|---|---|---|---|
| 5,841,201 | A | * | 11/1998 | Tabata et al. | ............... | 290/40 C |
| 6,083,138 | A | | 7/2000 | Aoyama et al. | | |
| 6,364,807 | B1 | | 4/2002 | Koneda et al. | | |
| 6,997,275 | B2 | | 2/2006 | Mesiti et al. | | |
| 7,198,123 | B2 | * | 4/2007 | Imazu et al. | ............. | 180/65.25 |
| 2004/0029677 | A1 | * | 2/2004 | Mori et al. | ...................... | 477/3 |
| 2005/0155803 | A1 | | 7/2005 | Schiele | | |
| 2006/0169504 | A1 | * | 8/2006 | Oliver et al. | ............... | 180/65.2 |

FOREIGN PATENT DOCUMENTS

| DE | 103 53 256 B3 | 3/2005 |
|---|---|---|
| JP | 11082260 | 3/1999 |
| JP | 11-178113 | 7/1999 |
| JP | 11-270668 | 10/1999 |
| JP | 200255285 | 9/2000 |
| JP | 2001-219765 | 8/2001 |
| JP | 2003-165358 | 6/2003 |
| JP | 2003-212003 | 7/2003 |
| JP | 2003-521414 | 7/2003 |
| JP | 2003-521414 A | 7/2003 |

* cited by examiner

*Primary Examiner*—Glenn Dayoan
*Assistant Examiner*—Bridget Avery
(74) *Attorney, Agent, or Firm*—Young Basile (57) ABSTRACT

An engine of a hybrid vehicle is lift started by reducing a rotational speed of a motor/generator of the hybrid vehicle by adjusting a gearshift ratio of a transmission coupled to the motor/generator, and engaging a clutch to couple the engine, while in a stopped state, to the rotating motor/generator for imparting the rotation to the engine.

17 Claims, 11 Drawing Sheets

ENGINE STARTING CONTROL DEVICE FOR A HYBRID VEHICLE

CROSS-REFERENCE

The present application claims priority under 35 U.S.C. §119 of Japanese Patent Application No. 2005-260028, filed on Sep. 8, 2005, the entire content of which is expressly incorporated by reference herein.

FIELD

The present invention pertains to an engine starting control device for a hybrid vehicle that constitutes a hybrid drive system in which a clutch having an adjustable torque capacity is disposed between the engine and the motor/generator and a transmission that changes the gearshift ratio continuously or in stages is disposed between the motor/generator and the drive wheels.

BACKGROUND

Conventionally, (e.g., Japanese Unexamined Patent Application Publication No. H11-82260) an engine, in a stopped state, is lift-started by temporarily releasing a second clutch disposed between a rotating motor/generator and the drive wheels. Then, a first clutch disposed between the engine and motor/generator is engaged to produce a drag torque in the first clutch that is used to lift start the engine. This procedure acts to reduce a torque fluctuation that otherwise takes place at the instant when the first clutch is engaged for coupling the engine to motor/generator for lift starting the engine while second clutch is engaged.

SUMMARY

In the case of the aforementioned engine starting control technology for a hybrid vehicle, when lift-starting the engine, one possible scenario is that the engine is lift-started in the stopped state while the motor/generator is rotating at a high rpm. In such a case, a problem occurs in which the rotational difference in the first clutch disposed between the engine and the motor/generator increases and heat is generated in the first clutch due to the slip engagement associated with a large amount of slip, resulting in possible deterioration of the durability of the first clutch.

The present invention was contrived in light of the aforementioned problem and its objective is to provide an engine starting control device for a hybrid vehicle that can suppress the deterioration of the durability of the first clutch and improve fuel consumption, while at the same time, ensuring a rotational state in which the engine can be started when switching modes to the hybrid operation mode when driving in the electric operation mode.

In order to achieve the aforementioned objective, the present invention pertains to an engine starting control device for a hybrid vehicle that constitutes a hybrid drive system in which a first clutch capable of changing the torque capacity is disposed between the engine and the motor/generator and a transmission that changes the gearshift ratio continuously or in stages is disposed between the motor/generator and the drive wheels. The engine starting control device is equipped with an engine starting control means that lift-starts the engine while it is in the stopped state using the drag torque of the first clutch when there is a request to switch modes to the hybrid operation mode, which operates using the power from the engine and motor/generator as the power source, when driving in the electric operation mode in which the first clutch is released and the vehicle operates using only the motor/generator as the power source. The engine starting control means controls the gearshift ratio of the transmission so as to lower the transmission input rotation speed when switching modes to the hybrid operation mode when driving in the electric operation mode.

Therefore, according to the engine starting control device for a hybrid vehicle pertaining to the present invention, the engine starting control means controls the gearshift ratio of the transmission so as to lower the transmission input rotation speed when switching modes to the hybrid operation mode in accordance with the decrease in the battery charge capacity, the increase in the vehicle speed, or the drive force request made by the driver, for example, when driving in the electric operation mode. Lowering the transmission input rotation speed by controlling the gearshift ratio of the transmission when switching modes to the hybrid operation mode acts to reduce the difference between the rotational speed of the motor/generator and the rotational speed of the engine compared to when no control of the gearshift ratio of the transmission is performed. This reduces the rotational difference across the clutch located between the motor/generator and the engine and thus reduces heat generation in the clutch, thereby reducing the deterioration of the durability of the clutch.

DETAILED DESCRIPTION

Below is provided a description of the most favorable embodiment for realizing the engine starting control device for a hybrid vehicle pertaining to the present invention, based on Embodiments 1 and 2 shown in the Drawings.

Embodiment 1

Figure 1:
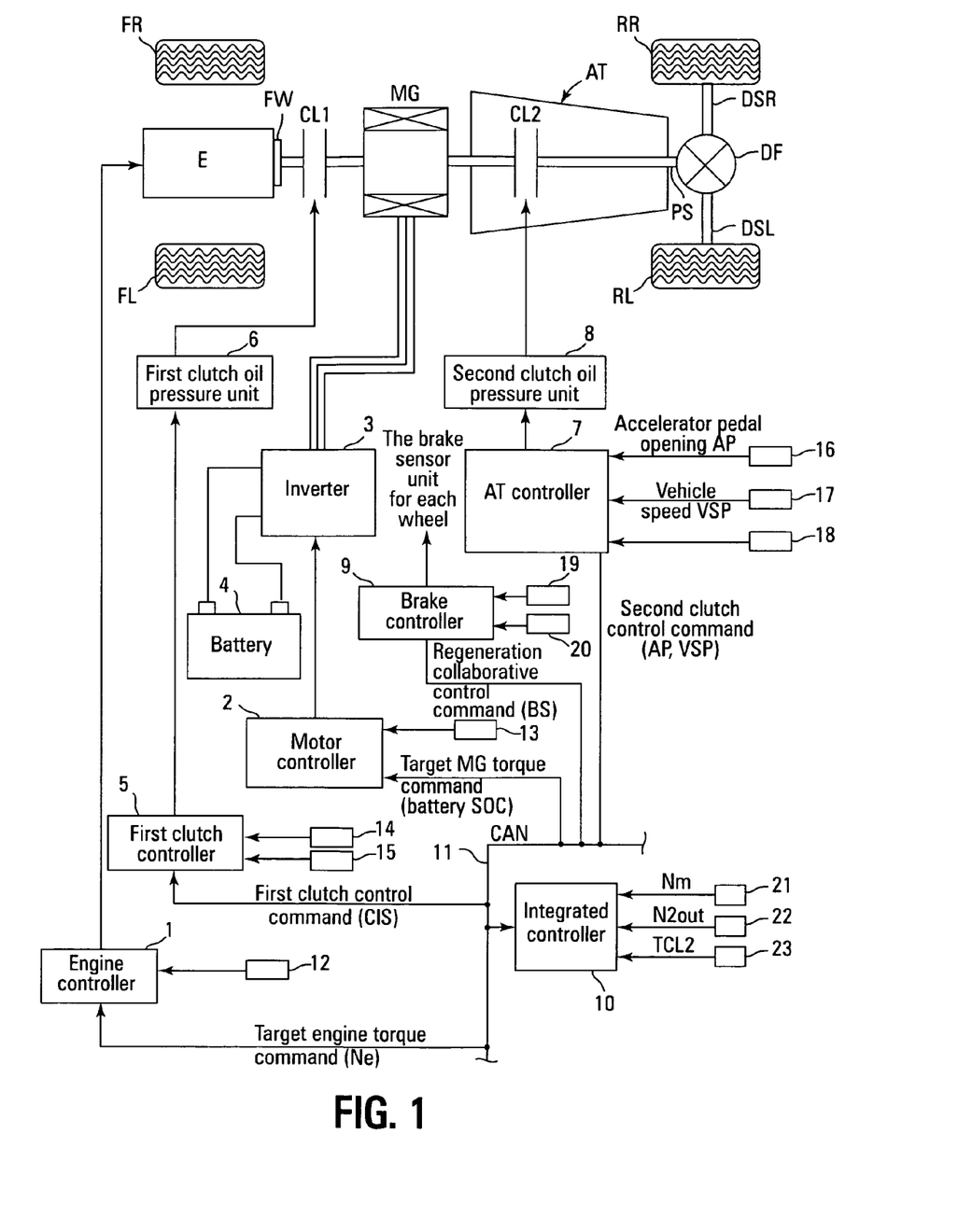
FIG. 1 is an overall system diagram of a rear-wheel drive hybrid vehicle in which the engine starting control device pertaining to Embodiment 1 has been applied.

First is provided an explanation of the constitution of the drive system for a hybrid vehicle. FIG. 1 is an overall system diagram of a rear-wheel drive hybrid vehicle in which the engine starting control device pertaining to Embodiment 1 has been applied. As shown in FIG. 1, the drive system for the hybrid vehicle pertaining to Embodiment 1 comprises engine E, flywheel FW, first clutch CL1, motor/generator MG, second clutch CL2, automatic transmission AT, propeller shaft PS, differential DF, left drive shaft DSL, right drive shaft DSR, left rear wheel RL (drive wheel) and right rear wheel RR (drive wheel). FL refers to the left front wheel and FR refers to the right front wheel.

Engine E is either a gasoline or a diesel engine, where the valve opening of the throttle valve is controlled based on a control command from engine controller 1, which is described below. On the engine output shaft is provided flywheel FW.

The first clutch CL1 is the clutch disposed between the engine E and the motor/generator MG, and the engagement/release, including the slip engagement and slip release, are controlled by means of a control oil pressure generated by first clutch oil pressure unit 6 in accordance with the control command from the first clutch controller 5 described below.

The motor/generator MG is a synchronous type motor/generator that has a permanent magnet embedded in its rotor and a stator coil wrapped around its stator and is controlled by applying a three-phase alternating current generated by inverter 3 in accordance with the control command from the motor controller 2 described below. Motor/generator MG receives the supply of electric power from the battery 4 and operates as an electric motor that performs rotary drive (hereafter this state is referred to as "power running"), but can also function as a generator that generates electromotive force at both ends of the stator coil when the rotor rotates by means of an external force in order to charge battery 4 (hereafter this operating state is referred to as "regenerative power"). The rotor for motor/generator MG is linked to the input shaft of automatic transmission AT via a damper not shown in the drawing.

The second clutch CL2 is the clutch disposed between the motor/generator MG and the right and left rear wheels RL and RR. The engagement/release of second clutch, including the slip engagement and slip release, are controlled by means of a control oil pressure generated by second clutch oil pressure unit 8 in accordance with the control command from the AT controller 7 described below.

The automatic transmission AT is a transmission that automatically switches the gearshift ratio in steps, such as 5 forward speeds and 1 reverse speed or 6 forward speeds and 1 reverse speed, in accordance with the vehicle speed and the accelerator pedal opening, and the second clutch CL2 is not an exclusive clutch that has been newly added, but utilizes a number of friction engagement elements from a plurality of friction engagement elements that are engaged at each gear shift in the automatic transmission AT. Furthermore, the output shaft of the automatic transmission AT is linked to the left and right rear wheels RL and RR via propeller shaft PS, differential DF, left drive shaft DSL and right drive shaft DSR.

A multi-plate wet clutch that uses a proportional solenoid to continuously control the oil flow rate and oil pressure may be used for the first and second clutches CL1 and CL2. In the present hybrid drive system, there are two operating modes that operate in accordance with the engagement/release of the first clutch CL1. An electric operation mode (hereafter referred to as "EV mode") is used when the first clutch CL1 is in a released state and when operating using only the power from motor/generator MG, and a hybrid operation mode (hereafter referred to as HEV mode) is used when the first clutch CL1 is an engaged state and when operating using power from the engine E and the motor/generator MG.

Next is provided an explanation of the control system for a hybrid vehicle. As shown in FIG. 1, the control system for the hybrid vehicle pertaining to Embodiment 1 comprises engine controller 1, motor controller 2, inverter 3, battery 4, first clutch controller 5, first clutch oil pressure unit 6, AT controller 7, second clutch oil pressure unit 8, brake controller 9, and integrated controller 10. Engine controller 1, motor controller 2, first clutch controller 5, AT controller 7, brake controller 9, and integrated controller 10 are connected via a CAN communication line that allows for their mutual exchange of information.

Engine controller 1 inputs the engine rotation speed information from engine rotation speed sensor 12 and outputs the command that controls the engine operating points (Ne, Te) to a throttle valve actuator, not shown in the drawing, in accordance with the target engine torque command from integrated controller 10. The information pertaining to the engine rotation speed Ne is supplied to the integrated controller 10 via the CAN communication line.

Motor controller 2 inputs the information from resolver 13, which detects the rotation position of the rotor of motor/generator MG and outputs the command that controls the motor operating points (Nm, Tm) of motor/generator MG to inverter 3 in accordance with the target motor/generator torque command from integrated controller 10. Motor controller 2 monitors the battery SOC, which indicates the charged state of the battery 4, and the battery SOC information is not only used for the control information for motor/generator MG, but is also supplied to integrated controller 10 via the CAN communication line.

First clutch controller 5 inputs the sensor information from first clutch oil pressure sensor 14 and first clutch stroke sensor 15 and outputs the command that controls the engagement/release of first clutch CL1 to first clutch oil pressure unit 6 in accordance with the first clutch control command from integrated controller 10. The first clutch stroke information C1S is supplied to integrated controller 10 via the CAN communication line.

The AT controller 7 inputs the sensor information from accelerator pedal opening sensor 16, vehicle speed sensor 17, and second clutch oil pressure sensor 18 and outputs the command that controls the engagement/release of the second clutch CL2 to the second clutch oil pressure unit 8 inside of the AT oil pressure control valve in accordance with the second clutch control command from integrated controller 10. The accelerator pedal opening AP and vehicle speed VSP information are supplied to integrated controller 10 via the CAN communication line.

Brake controller 9 inputs the sensor information from wheel speed sensor 19, which detects the wheel speed of each of the 4 wheels, and brake stroke sensor 20 and performs regeneration collaborative brake control in accordance with the regeneration collaborative command from integrated controller 10 so as to compensate for the insufficient mechanical braking force (fluid pressure braking force or motor braking force) when regenerative braking force alone is not sufficient in relation to the required braking force requested from the brake stroke BS when braking is performed by pressing on the brake pedal.

Integrated controller 10 manages the energy consumed by the entire vehicle and assumes the functions necessary to run the vehicle at the maximum efficiency, and therefore inputs the information obtained from motor rotation speed sensor 21 that detects the motor rotation speed Nm, second clutch output rotation speed sensor 22 that detects the second clutch output rotation speed N2out, second clutch torque sensor 23 that detects the second clutch torque TCL2, and the information obtained via the CAN communication line. Further, integrated controller 10 performs operation control of engine E by means of a control command sent to engine controller 1, operation control of motor/generator MB by means of a control command sent to motor controller 2, engagement/release control of first clutch CL1 by means of a control command sent to first clutch controller 5, and engagement/release control of second clutch CL2 by means of a control command sent to AT controller 7.

Figure 2:
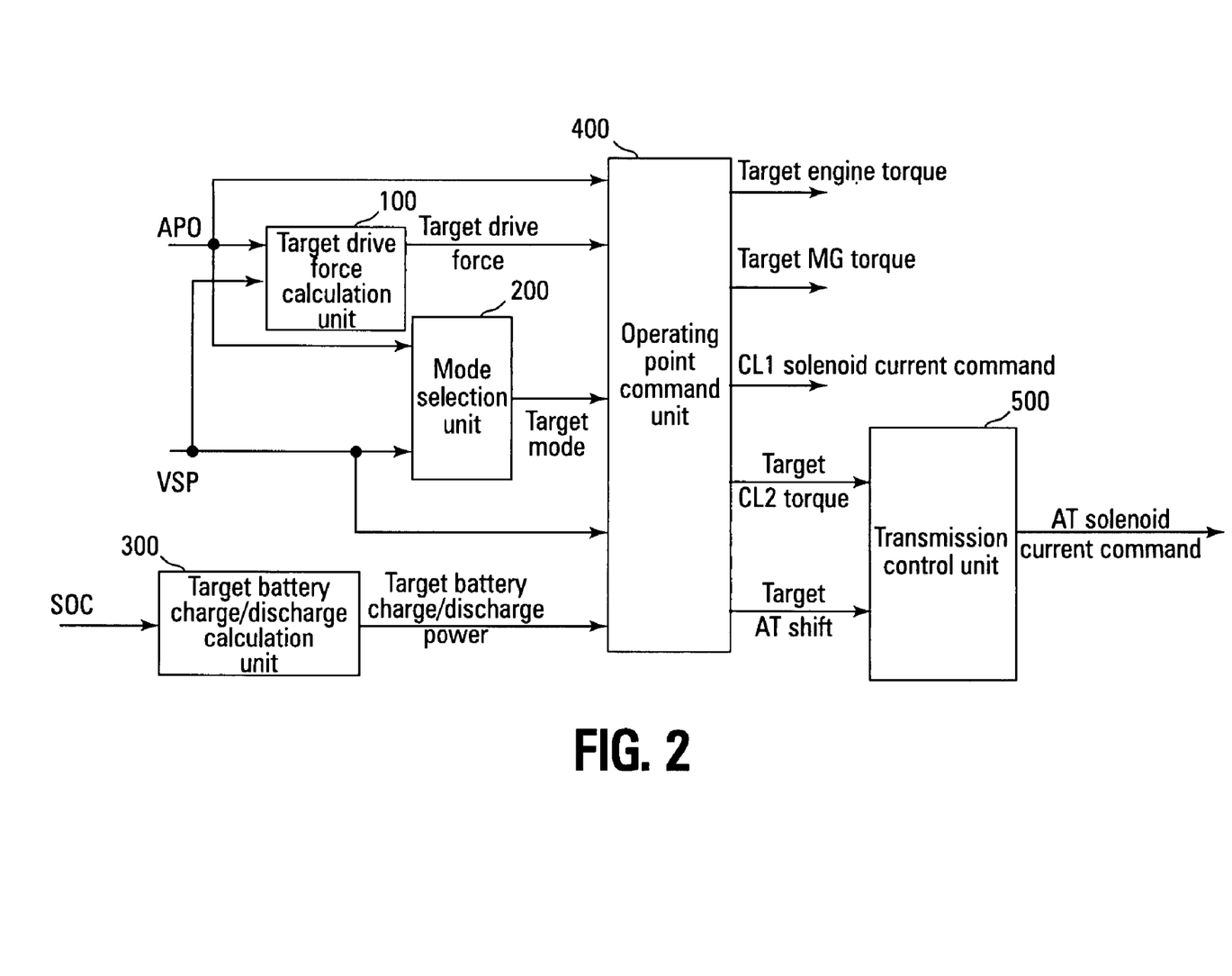
FIG. 2 is a control block diagram showing the arithmetic-processing program for the integrated controller pertaining to Embodiment 1.

Below is provided an explanation of the control calculated by integrated controller 10 of Embodiment 1 using the block diagram shown in FIG. 2. This calculation is performed at integrated controller 10 in a control cycle consisting of 10 msec intervals, for example.

Figure 3:
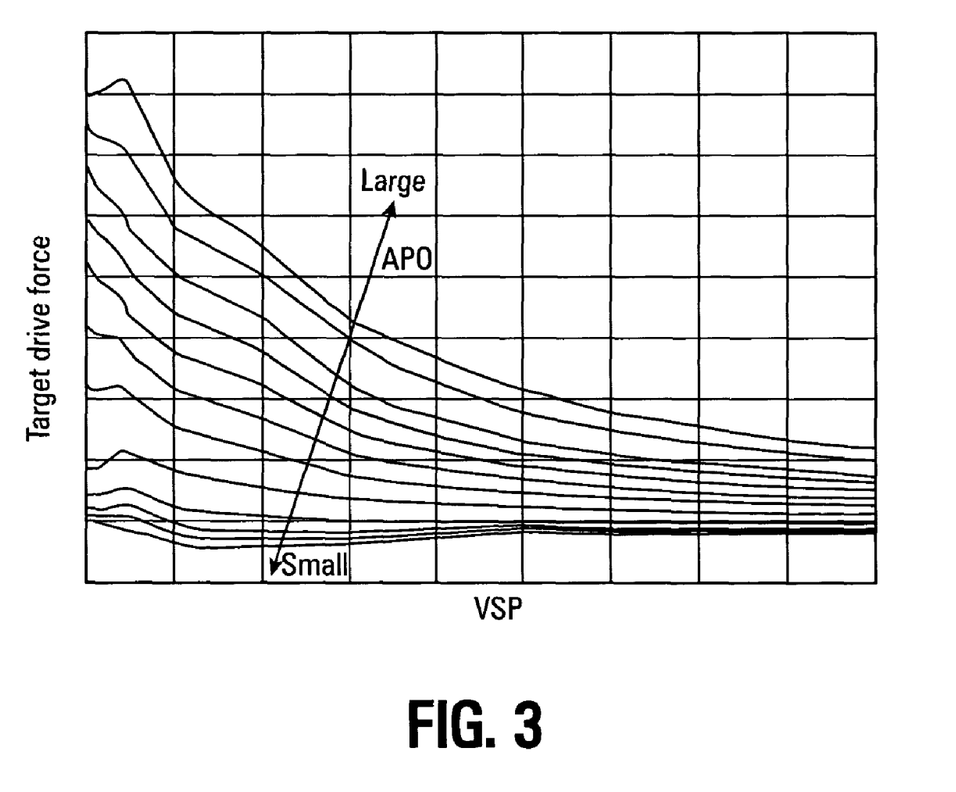
FIG. 3 is a diagram showing one example of the target drive force map used for the target drive force calculation performed at the target drive force calculation unit shown in FIG. 2.
Figure 4:
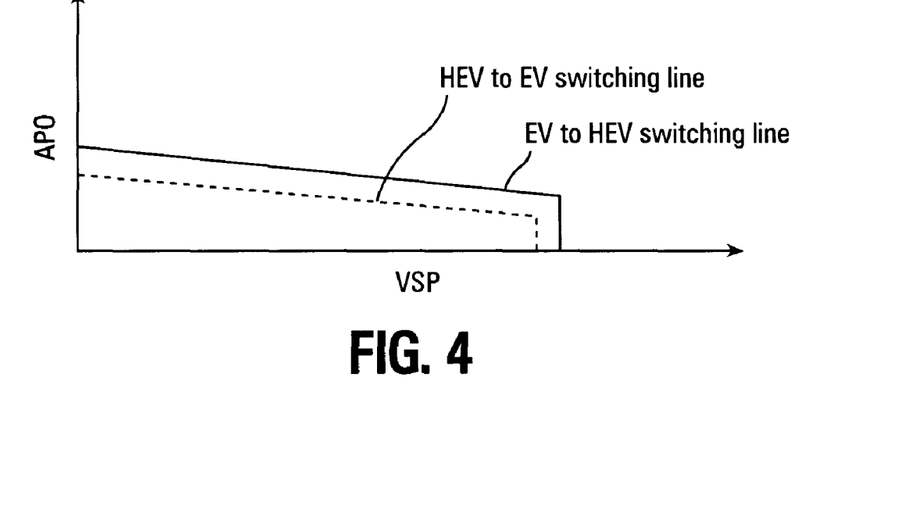
FIG. 4 is a diagram showing one example of the target mode map used for selecting the target mode by the mode selection unit shown in FIG. 2.
Figure 5:
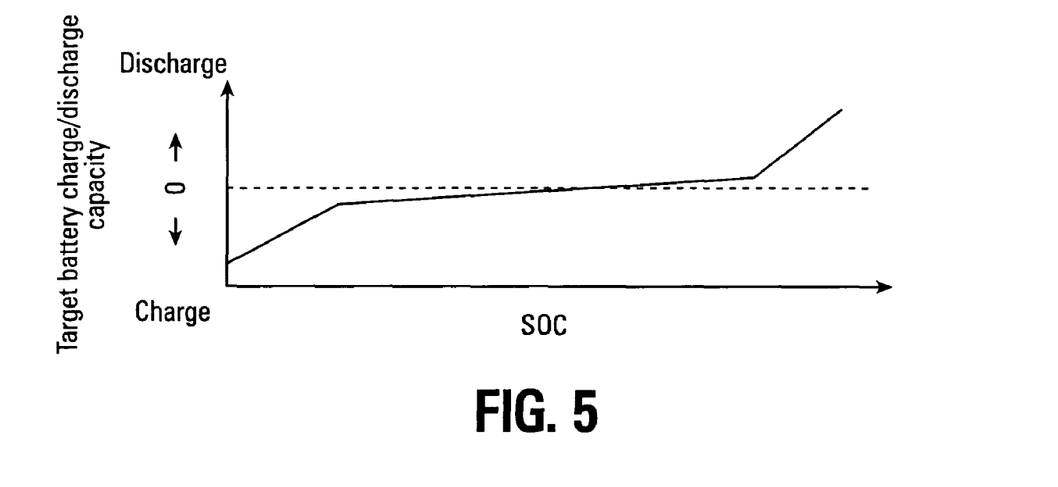
FIG. 5 is a diagram showing one example of the target battery charge/discharge capacity map used to calculate the target battery charge/discharge power by the target battery charge/discharge calculation unit shown in FIG. 2.

Integrated controller 10 comprises target drive force calculation unit 100, mode selection unit 200, target battery charge/discharge calculation unit 300, operating point command unit 400, and transmission control unit 500. Target drive force tFo0 is calculated at the target drive force calculation unit 100 from the accelerator pedal opening APO and vehicle speed VSP using the target drive force map shown in FIG. 3. The target mode is calculated at aforementioned mode selection unit 200 from the accelerator pedal opening APO and the vehicle speed VSP using the EV-HEV selection map shown in FIG. 4. However, if the battery SOC is less than a prescribed value, the HEV mode is mandatorily set as a target mode. The target battery charge/discharge power tP is calculated at aforementioned target battery charge/discharge calculation unit 300 from the battery SOC using the target battery charge/discharge capacity map shown in FIG. 5. The transitional target engine torque, target motor/generator torque, target second clutch torque capacity, target automatic transmission shift, and first clutch solenoid current command are calculated at aforementioned operating point command unit 400 from the accelerator pedal opening APO, the target drive force tFo0, the target mode, the vehicle speed and the target battery charge/discharge as the attainable targets for the operating points of these values.

The solenoid valve inside of the automatic transmission AT is drive controlled at aforementioned transmission control unit 500 from the target second clutch torque capacity and the target automatic transmission shift so as to achieve these values.

Figure 6:
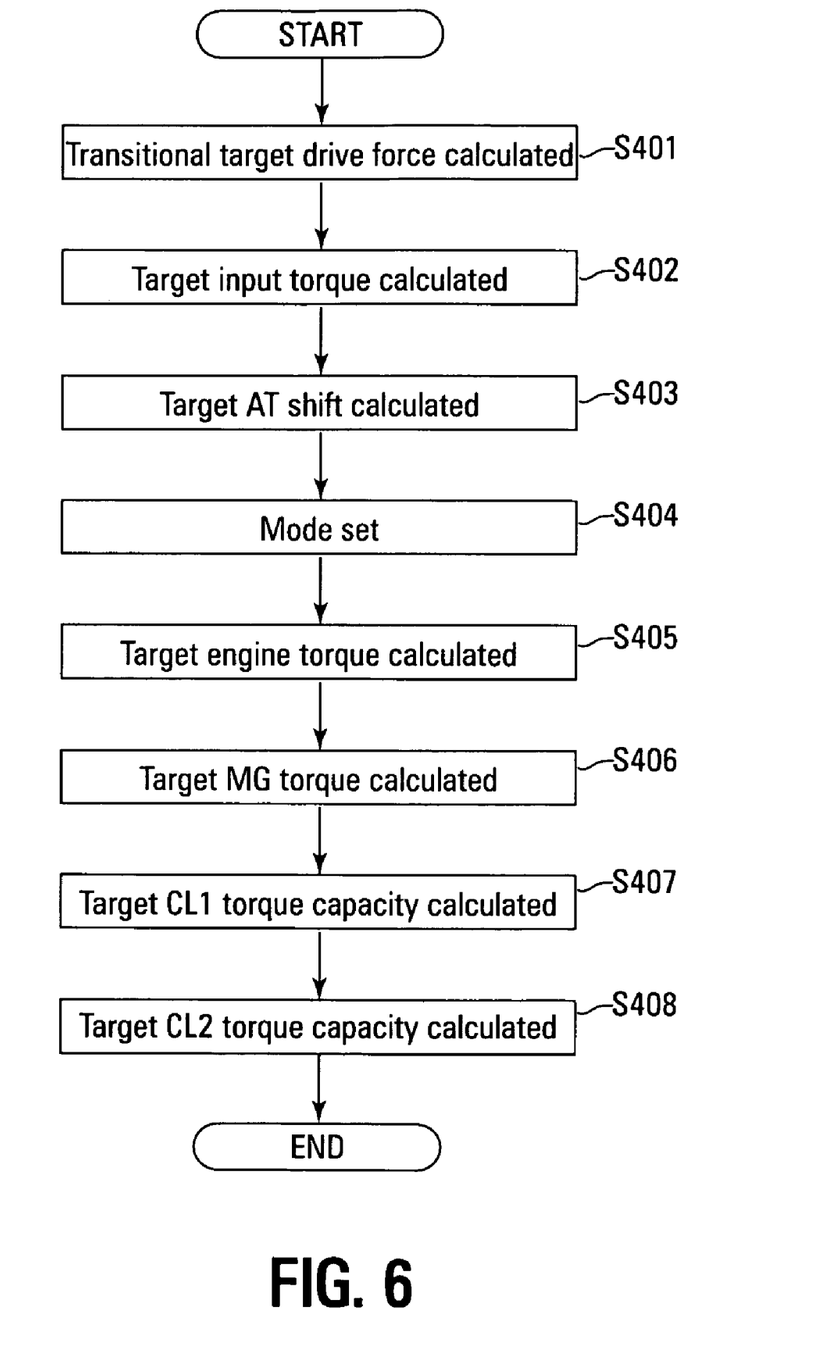
FIG. 6 is a flowchart showing the arithmetic processing used to determine each operation point by the operating point command unit shown in FIG. 2.

FIG. 6 is a flowchart showing the flow of the arithmetic process for calculating the operating point command executed at the operating point command unit of integrated controller 10, and provided below is an explanation for each step of this process.

At step S401, the transitional target drive force tFo obtained by performing a prescribed tuning on the target drive force tFo0 is calculated, and the process proceeds to step S402. The transitional target drive force tFo can be set from the output of a low-pass filter that has a prescribed time constant with the target drive force tFo0 as its input, for example.

After the transitional target drive force calculation has been performed at step S401, equation (1) is used at step S402 to calculate the target input torque tTin of the automatic transmission AT.

$$tTin = tFo \times rt/if/iG \quad (1)$$

where 'rt' is the radius of the tire, 'if' is the final gear ratio, and 'iG' is the gear ratio of the actual automatic transmission shift in current time.

Figure 7:
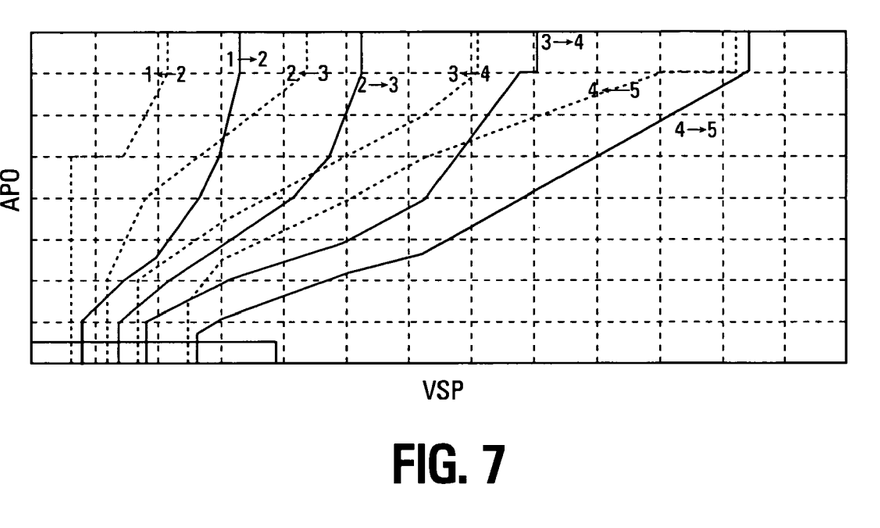
FIG. 7 is a diagram showing one example of the shift map used for the target automatic transmission shift calculation step shown in FIG. 6.

After the target input torque has been calculated at step S402, at step S403, the shift map shown in FIG. 7 is used to calculate the target automatic transmission shift from the accelerator pedal opening APO and the vehicle speed VSP, and the process proceeds to step S404. In FIG. 7, the solid line represents the upshift line and the broken line represents the downshift line.

Figure 8:
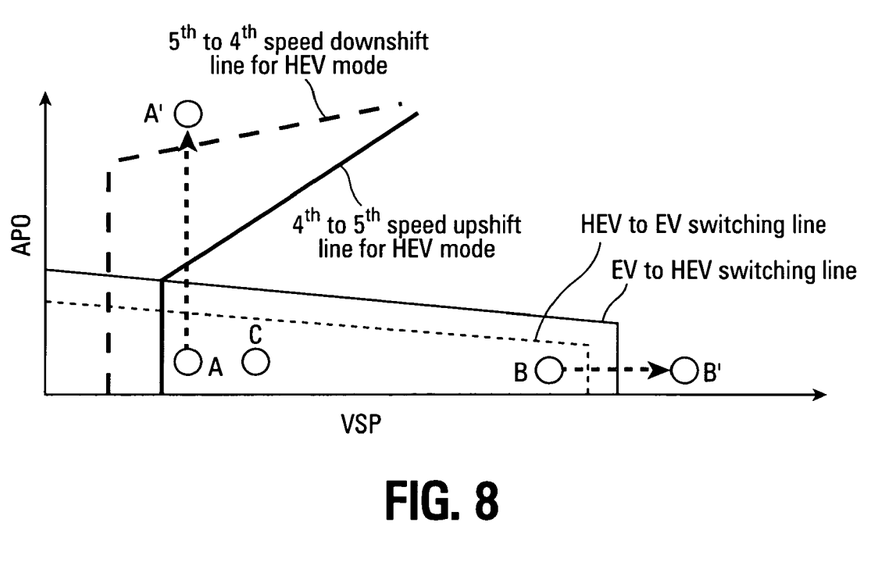
FIG. 8 is a diagram showing one example of the operation point map for when the target mode set according to the mode-setting step shown in FIG. 6 transitions from a EV mode to an HEV mode.

FIG. 8 shows an example of an upshift line from the $4^{th}$ speed to the $5^{th}$ speed and a downshift line from the $5^{th}$ speed to the $4^{th}$ speed. When changing the accelerator pedal opening from point A to point A', which cross over the downshift line, the engine is started in conjunction with a downshift. On the other hand, when a request is made to start the engine with a low battery SOC while operating steadily in the EV mode at point C, or when a request is made to start the engine due to an increase in the vehicle speed, such as the case for point B to point B', the engine is started without making a shift change. However, the target automatic transmission gear ratio is set so that the automatic transmission input rotation speed is higher than the rotation speed in which the engine can operate for the current time vehicle speed.

After the target automatic transmission shift is calculated at step S403, at step S404, the mode selection is performed in accordance with the target mode and the process proceeds to step S405.

Normally, the vehicle operates in either the EV mode or the HEV mode. If the target mode becomes the HEV mode while operating in the EV mode, the mode is selected in accordance with the mode transition map shown in FIG. 10, and the switching operation from the EV mode to the HEV mode that accompanies the starting of the engine is performed.

After the mode is set in step S404, at step S405, if operating in the HEV mode, the following equation is used to calculate the ideal engine torque tTe0 from the target input torque tTin, the automatic transmission input rotation speed Nin, and the engine rotation speed Ne:

$$tTeo = (tTin \times Nin - tP)/Ne \quad (2)$$

Figure 9:
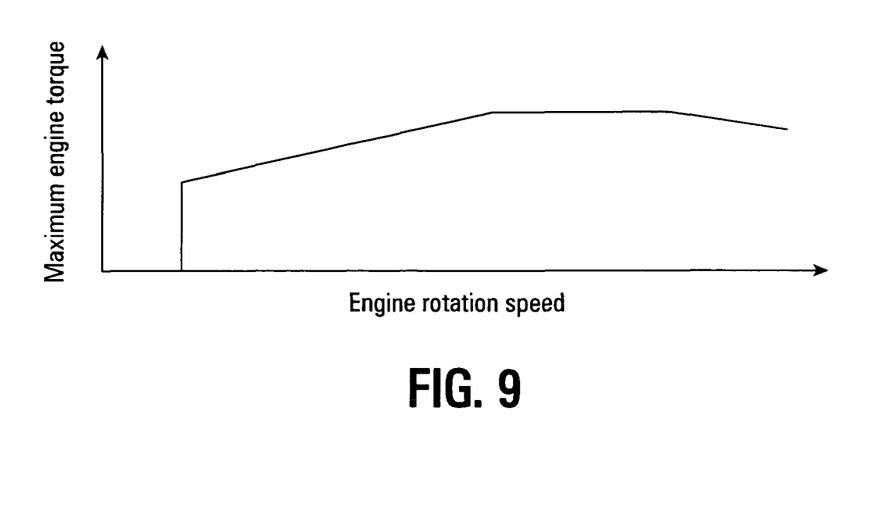
FIG. 9 is a diagram showing one example of the maximum engine torque map in relation to the engine rotation speed used for the target engine torque calculation step shown in FIG. 6.

Then, the maximum engine torque that is limited by the ideal engine torque tTeo is set as the target engine torque tTe in accordance with the engine rotation speed Ne using the maximum engine torque map shown in FIG. 9. In addition, when operating in the EV mode, the target engine torque tTe is set to zero.

After the target engine torque is calculated at step S405, at step S406, if operating in either the EV mode or the HEV mode, the target motor/generator torque tTm is calculated using the following equation:

$$tTm = tTin - tTe \qquad (3)$$

If this takes place while switching modes, the target motor/generator torque is determined according to the operation performed while switching modes described below.

After the target motor/generator torque is calculated at step S406, at step S407, if operating in the EV mode, the target first clutch torque capacity is set to zero, and if operating in the HEV mode, the target first clutch torque capacity is set to the maximum value. If this takes place while switching modes, the target first clutch torque capacity is determined according to the operation performed while switching modes described below.

After the target first clutch torque capacity is calculated at step S407, at step S408, if operating in the EV mode, the target second clutch torque capacity tcTc12 is set as the maximum drive force equivalent evTmax for the EV mode, and if operating in the HEV mode, the target second clutch torque capacity tcTc12 is set at the maximum value. If this takes place while switching modes, the target second clutch torque capacity tcTc12 is determined according to the operation performed while switching modes described below and the process ends.

Next is provided an explanation of the operation. An explanation is provided of the switching control operation from the EV mode to the HEV mode that accompanies the starting of the engine using the mode transition map shown in FIG. 10 and the time charts shown in FIG. 11 through FIG. 13.

Figure 11:
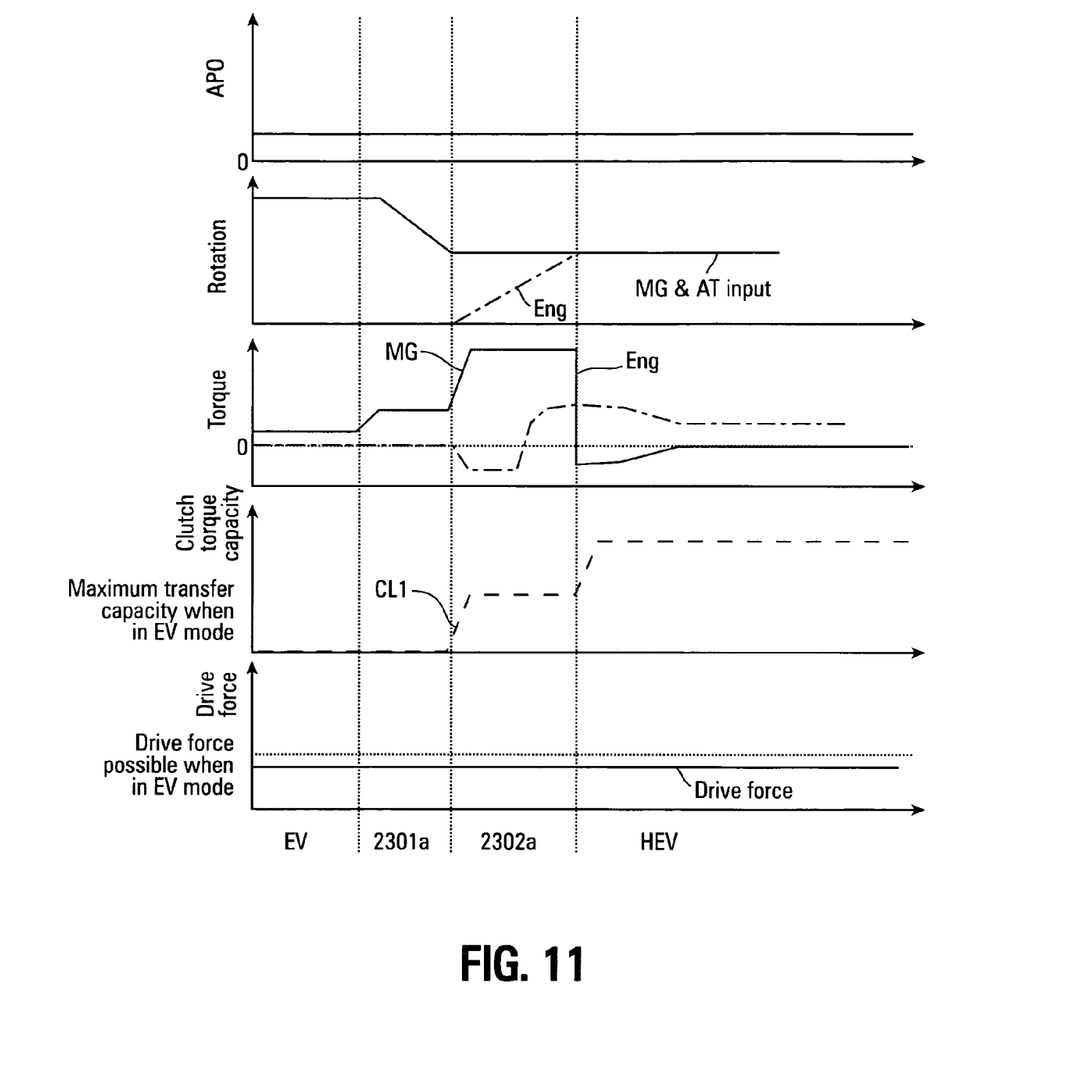
FIG. 11 is a time chart for the engine starting process that accompanies an upshift for the engine starting control device pertaining to Embodiment 1.
Figure 12:
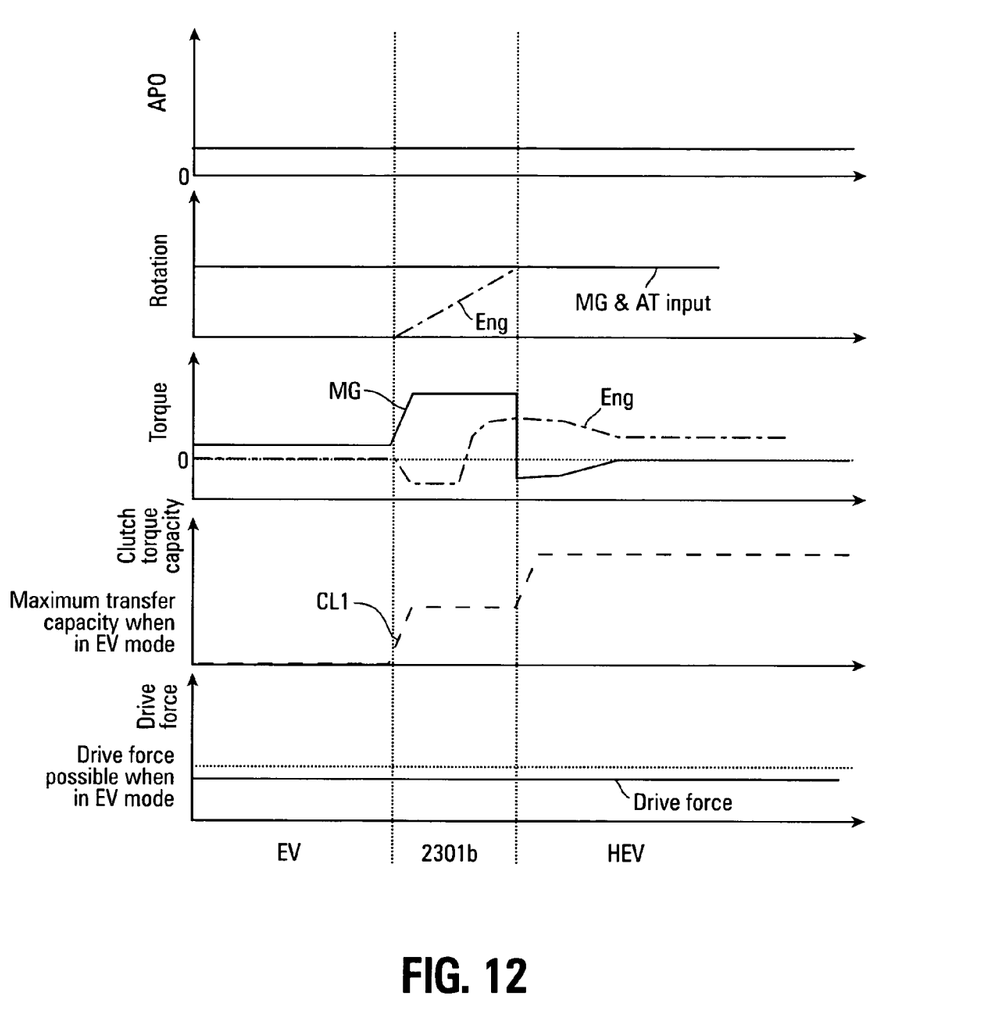
FIG. 12 is a time chart for the engine starting process that does not accompany a shift change for the engine starting control device pertaining to Embodiment 1.
Figure 13:
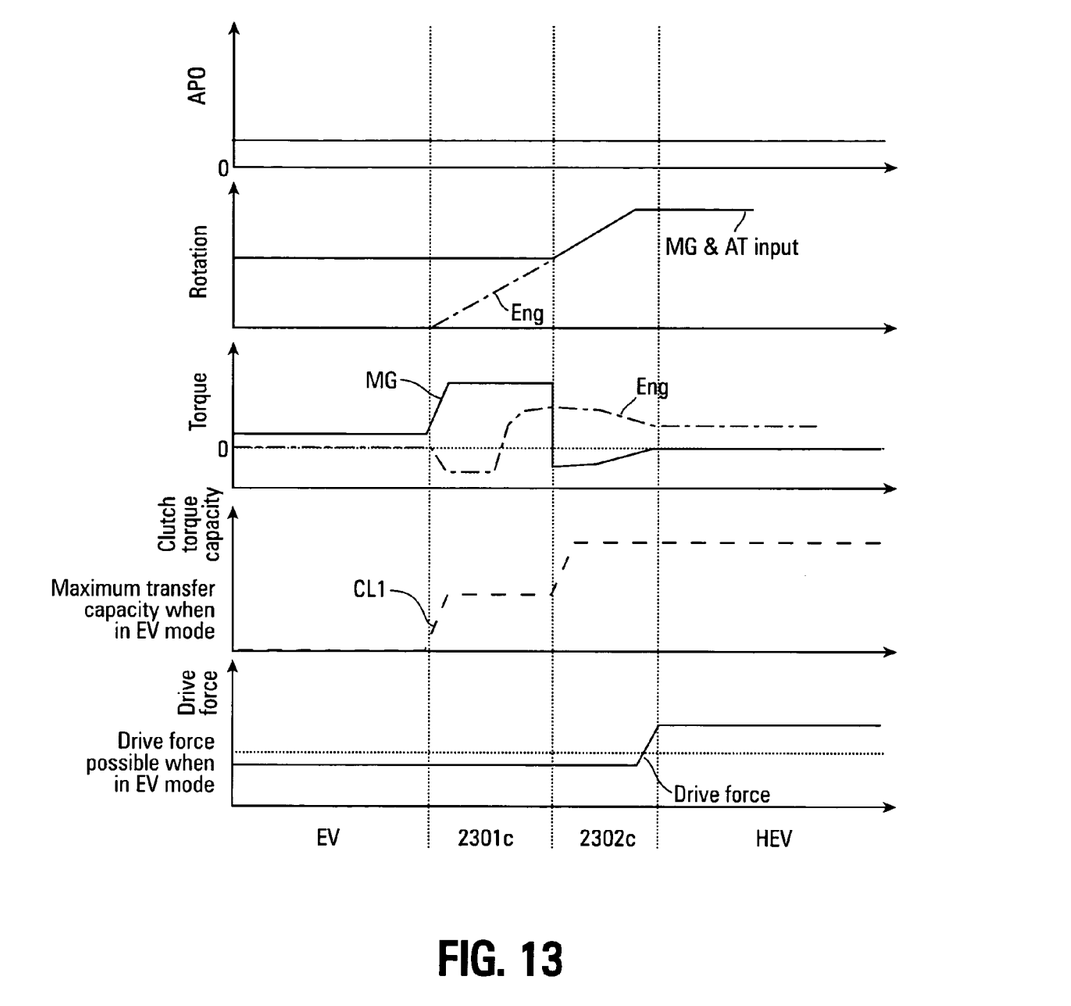
FIG. 13 is a time chart for the engine starting process that accompanies a downshift for the engine starting control device pertaining to Embodiment 1.

FIG. 11 is the time chart for the starting of the engine that accompanies an upshift, FIG. 12 is the time chart for the starting of the engine that does not accompany a shift change, and FIG. 13 is the time chart for the starting of the engine that accompanies a downshift. All three of these drawings are time charts that show, in order from the top, the accelerator pedal opening APO, the rotation speed (solid line: motor/generator, broken line: automatic transmission input, dot-dashed line: engine), the torque (solid line: motor/generator, dot-dashed line: engine), the clutch torque capacity (broken line: the first clutch, solid line: the second clutch), and the drive force.

When a request to transition to the HEV mode that accompanies an upshift is made.

Figure 10:
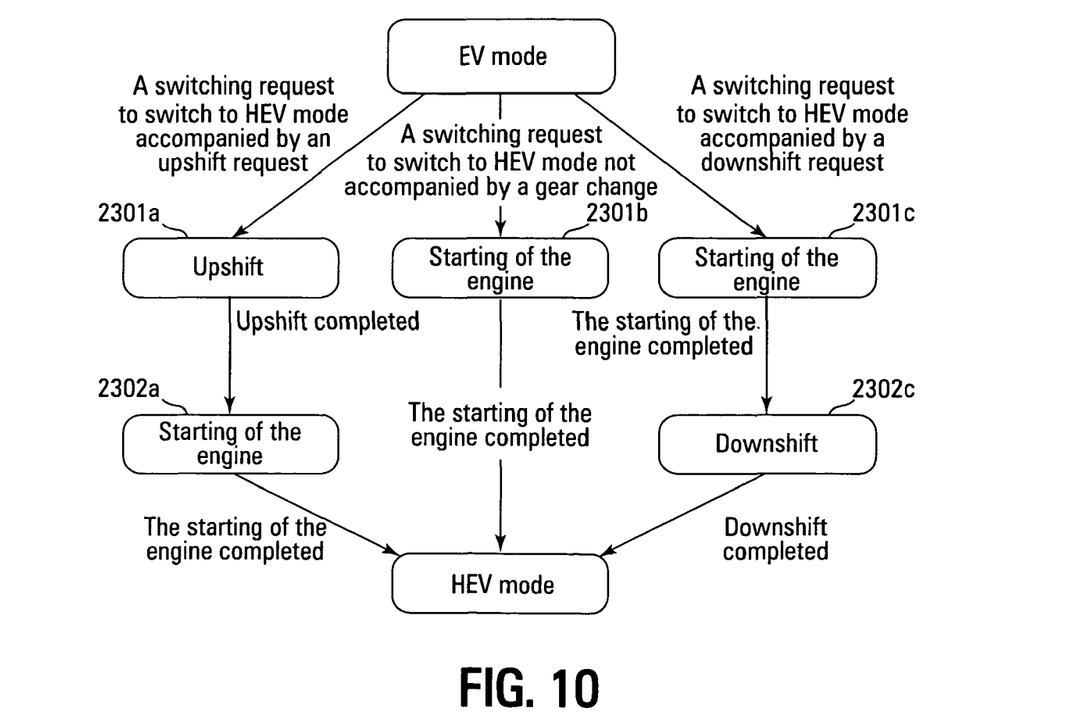
FIG. 10 is a diagram showing three mode transition patterns for when transitioning from an EV mode to a HEV mode for the engine starting control pertaining to Embodiment 1.

An explanation is now provided for the starting of the engine that accompanies an upshift using the mode transition map shown in FIG. 10 and the time chart shown in FIG. 11.

As shown in FIG. 10 and FIG. 11, when a request is made to transition to the HEV mode that accompanies an upshift while operating in the EV mode, the process transitions to mode 2301a, and an upshift is performed first. When this takes place, in order to prevent a decrease in the drive force due to a switch in the engagement elements during the torque phase of the upshift, the motor/generator torque is raised so as to synchronize with the switch in the engagement elements. In addition, the change in the gearshift ratio that takes place during the inertia phase of the upshift can be assisted by the motor/generator torque.

Then, after the upshift is completed, the process transitions to mode 2302a and the lift-start of engine E by first clutch CL1 is performed. When this takes place, the drag torque of first clutch CL1 is compensated for by motor/generator MG and the decrease in the drive force is suppressed. However, it is not necessary to make the point at which the upshift is completed and the point at which the engagement of first clutch CL1 begins coincide with one another, and the lift-start of engine E by first clutch CL1 can be performed before the upshift is completed.

When a request to transition to the HEV mode that does not accompany a shift change is made An explanation is provided for the starting of the engine that does not accompany a shift change using the mode transition map shown in FIG. 10 and the time chart shown in FIG. 12.

As shown in FIG. 10 and FIG. 12, when a request is made to transition to the HEV mode that does not accompany a shift change while operating in the EV mode, the process transitions to mode 2301b, and the lift-start of engine E by first clutch CL1 is performed. When this takes place, the drag torque of first clutch CL1 is compensated for by motor/generator MG and the decrease in the drive force is suppressed.

When a request to transition to the HEV mode that accompanies a downshift is made An explanation is provided for the starting of the engine that accompanies a downshift using the mode transition map shown in FIG. 10 and the time chart shown in FIG. 13.

As shown in FIG. 10 and FIG. 13, when a request is made to transition to the HEV mode that accompanies a downshift while operating in the EV mode, the process transitions to mode 2301c, and the lift-start of engine E by first clutch CL1 is performed first. When this takes place, the drag torque of first clutch CL1 is compensated for by motor/generator MG and the decrease in the drive force is suppressed. Then, after the starting of engine E is has been completed and first clutch CL1 has been engaged, the process transitions to mode 2302c and a downshift is performed. At this point, the change in the gearshift ratio that takes place during the inertia phase of the downshift can be assisted by the motor/generator torque. In addition, the increase in the drive force that takes place during the torque phase of the downshift, as shown in FIG. 13, is permitted when a request to raise the drive force is made by pressing on the accelerator pedal.

The Engine Starting Control Operation

Conventionally, when lift-starting an engine in the stopped state using the drag torque of the first clutch disposed between the engine and motor/generator, in order to prevent the torque fluctuation that takes place when the engine is lift-started and at the instant in which the first clutch engages from being transferred to the output shaft, the engine is lift-started with the second clutch disposed between the motor/generator and the drive wheels in a temporarily released state.

However, when lift-starting the engine in such a manner, one possible scenario is that the engine is lift-started in the stopped state while the motor/generator (=transmission input axis) is rotating at a high rpm, and in such a case, the rotational difference in the first clutch disposed between the engine and the motor/generator increases and heat is generated in the first clutch due to the slip engagement accompanied by a large amount of slip, resulting in possible deterioration of the durability of the first clutch.

On the other hand, for the engine starting control device pertaining to Embodiment 1, by controlling the gearshift ratio of automatic transmission AT so that the transmission input rotation speed becomes close to the engine rotation speed that is possible for engine operation (that is, in a range in which the transmission input rotation speed is the same or more than the rotation speed that is possible for engine operations when transitioning to the HEV mode while operating in the EV mode, the deterioration of the durability of first clutch CL1 can be suppressed, while at the same time ensuring a rotational state in which engine E can be started, and the fuel consumption can also be improved.

In other words, for the engine starting control device pertaining to Embodiment 1, the operating point command unit 400 of integrated controller 10 (the engine starting control means) controls the gearshift ratio of the automatic transmission AT so that the transmission input rotation speed becomes close to the engine rotation speed that is possible for engine operation when transitioning modes to the HEV mode in accordance with the decrease in the battery SOC, the increase in the vehicle speed, or the drive force request made by the driver when pressing down on the accelerator pedal, for example, when driving in the EV mode.

In other words, for the engine starting control device pertaining to Embodiment 1, the operating point command unit 400 of integrated controller 10 (the engine starting control means) controls the gearshift ratio of the automatic transmission AT so that the transmission input rotation speed becomes close to the engine rotation speed that is possible for engine operation in a range in which the transmission input rotation speed is the same or more than the rotation speed that is possible for engine operation when transitioning modes to the HEV mode in accordance with the decrease in the battery SOC, the increase in the vehicle speed, or the drive force request made by the driver when pressing down on the accelerator pedal, for example, when driving in the EV mode.

At this point, by restricting the transmission input rotation speed (=motor/generator rotation speed) to be within a range that is equal to or greater than the rotation speed that is possible for engine operation, a rotational state in which engine E can be started from a stopped state using the drag torque of first clutch CL1 can be ensured.

In addition, when the transmission input rotation speed is higher than the rotation speed that is possible for engine operation, the gear position can be changed to the low rotation speed side by means of an upshift so that compared to when the gearshift ratio of the transmission is not controlled at all when starting the engine, the rotational difference (the difference between the motor/generator rotation speed and the engine rotation speed) in the first clutch CL1 that takes place when lift-starting engine E can be reduced and the deterioration of the durability of first clutch CL1 due to the generation of heat in the clutch can be suppressed.

Furthermore, since the motor/generator MG is more efficient at the high rotation-low torque side, and the engine E is more efficient at the low rotation-high torque side, when transitioning from the EV mode to the HEV mode, fuel consumption can be improved by controlling the gearshift ratio to be close to the rotation speed that is possible for engine operation and by suppressing the engine rotation speed to low rotation.

The engine starting control means for the engine starting control device pertaining to Embodiment 1 transitions from the EV mode to upshift mode 2301*a* to the engine starting mode 2302*a* to the HEV mode in conjunction with an upshift request, as shown in FIG. 10, when transitioning modes to the HEV mode due to a decrease in the battery SOC or an increase in the vehicle speed while operating in the EV mode, after which it upshifts automatic transmission AT and then completes the engagement of first clutch CL1. Therefore, the rotational difference of first clutch CL1 can be minimized during the time period until the lift-start of engine E is completed and the deterioration of the durability of the clutch due to heat generation in first clutch CL1 can be further suppressed.

The engine starting control means for the engine starting control device pertaining to Embodiment 1 transitions from the EV mode to upshift mode 2301*a* to engine starting mode 2302*a* to the HEV mode in conjunction with an upshift request, as shown in FIG. 10, when transitioning modes to the HEV mode due to a decrease in the battery SOC or an increase in the vehicle speed while operating in the EV mode, after which it completes the upshift at automatic transmission AT, starts the engagement of first clutch CL1, and lift-starts engine E while it is in the stopped state by means of the drag torque of said first clutch CL1. Therefore, the rotational difference of first clutch CL1 can be minimized from the starting point of the lift-start of engine E and the deterioration of the durability of the clutch due to heat generation in first clutch CL1 can be even further suppressed.

The engine starting control means for the engine starting control device pertaining to Embodiment 1 raises the torque of motor/generator MG in accordance with the decrease in the torque transfer ratio in automatic transmission AT that accompanies the upshift of the gearshift ratio of automatic transmission AT, as shown in the motor/generator torque characteristics at upshift mode 2301*a* in FIG. 11. Therefore, the decrease in the drive force due to the upshift is suppressed and the continuity of the drive force can be ensured, as shown by the drive force characteristics in FIG. 11.

The engine starting control means for the engine starting control device pertaining to Embodiment 1 transitions from the EV mode to engine starting mode 2301*b* to the HEV mode, as shown in FIG. 10, when not accompanied by a gear change request and when transitioning modes to the HEV mode due to a decrease in the battery SOC or an increase in the vehicle speed while operating in the EV mode, after which it immediately begins the engagement of first clutch CL1, and lift-starts engine E while it is in the stopped state by means of the drag torque of said first clutch CL1. Therefore, when transitioning modes from the EV mode to the HEV mode, said mode transitioning from the EV mode to the HEV mode can be completed with favorable responsiveness while suppressing the generation of heat in first clutch CL1 with a minimal rotational difference in first clutch CL1.

The engine starting control means for the engine starting control device pertaining to Embodiment 1 transitions from the EV mode to engine starting mode 2301*c* to downshift mode 2302*c* to the HEV mode in conjunction with an downshift request, as shown in FIG. 10, when transitioning modes to the HEV mode due to an increase in the accelerator pedal opening while operating in the EV mode, after which it completes the lift-start of engine E while it is in the stopped state by means of the drag torque of the first clutch CL1, and begins the downshift of automatic transmission AT. Therefore, the rotational difference in first clutch CL1 can be minimized at the time of the lift-start of engine E and the drive force can be raised by means of the downshift, as shown in the drive force characteristics at downshift mode 2302*c* in FIG. 13, while at the same time suppressing the deterioration of the durability of the clutch due to heat generation in the first clutch CL1. In addition, the higher the gear ratio is, the smaller the sensitivity is to the drive force fluctuation from the torque fluctuation due to the starting of the engine, so the shock experienced when starting the engine can be suppressed by starting the engine while this sensitivity is small.

When the engine starting control means for the engine starting control device pertaining to Embodiment 1 lift-starts engine E in the stopped state using the drag torque of the first clutch CL1, the drag torque of the first clutch CL1 is compensated for by motor/generator MG. Therefore, the decrease in the drive force due to the drag torque of first clutch CL1 is suppressed, and the continuity of the drive force is ensured as shown according to the drive force characteristics for engine starting mode 2302a in FIG. 11, the drive force characteristics for engine starting mode 2301b in FIG. 12 and the drive force characteristics for engine starting mode 2301c in FIG. 13.

Next is provided an explanation of the effects. The effects listed below can be achieved for the engine starting control device for a hybrid vehicle pertaining to Embodiment 1.

(1) The aforementioned engine starting control means can suppress the deterioration of the durability of first clutch CL1, while at the same time ensuring a rotational state in which engine E can be started and thus improve fuel consumption when transitioning modes to the HEV mode while operating in the EV mode by controlling the gearshift ratio of automatic transmission AT so that the transmission input rotation speed becomes close to the engine rotation speed that is possible for engine operation in a range in which the transmission input rotation speed is the same or more than the rotation speed that is possible for engine operation when transitioning to the HEV mode while operating in the EV mode.

(2) The aforementioned engine starting control means can minimize the rotational difference of first clutch CL1 during the time period until the lift-start of engine E is completed and suppress the deterioration of the durability of the clutch due to the generation of heat in first clutch CL1 by completing the engagement of first clutch CL1 after upshifting automatic transmission AT in conjunction with an upshift request when transitioning modes to the HEV mode while operating in the EV mode.

(3) The aforementioned engine starting control means can minimize the rotational difference of first clutch CL1 from the time at which the lift-start of engine E is started and even further suppress the deterioration of the durability of the clutch due to the generation of heat in first clutch CL1 by starting the engagement of first clutch CL1 and lift-starting engine E in the stopped state using the drag torque of first clutch CL1 after completing an upshift at automatic transmission AT in conjunction with an upshift request when transitioning modes to the HEV mode while operating in the EV mode.

(4) The aforementioned engine starting control means can suppress the decrease in the drive force due to an upshift and ensure the continuity of the drive force by raising the torque of the motor/generator MG in accordance with the decrease in the torque transfer ratio in automatic transmission AT that accompanies the upshift in the gearshift ratio of automatic transmission AT.

(5) The aforementioned engine starting control means can complete the mode transition from the EV mode to the HEV mode with a favorable responsiveness while at the same time suppressing the generation of heat in first clutch CL1 with minimal rotational difference in first clutch CL1 by immediately starting the engagement of first clutch CL1 and lift-starting engine E in the stopped state using the drag torque of first clutch CL1 when not accompanied by a gear change request when transitioning modes to the HEV mode while operating in the EV mode.

(6) The aforementioned engine starting control means can minimize the rotational difference in first clutch CL1 when lift-starting engine E and raise the drive force by means of a downshift while at the same time suppressing the deterioration in the durability of the clutch due to the heat generated in first clutch CL1 by starting the downshift of automatic transmission AT after completing the lift-start of engine E in a stopped state using the drag torque of first clutch CL1 in conjunction with a downshift request when transitioning modes to the HEV mode while operating in the EV mode. In addition, the higher the gear ratio is, the smaller the sensitivity is to the drive force fluctuation from the torque fluctuation due to the starting of the engine, so the shock experienced when starting the engine can be suppressed by starting the engine while this sensitivity is small.

(7) The aforementioned engine starting control means can suppress the decrease in the drive force due to the drag torque of first clutch CL1 and ensure the continuity of the drive force by compensating for the drag torque of first clutch CL1 by means of motor/generator MG when lift-starting engine E in the stopped state using the drag torque of first clutch CL1.

Embodiment 2

Embodiment 2 is an example of when two different maps are used for the EV mode and the HEV mode as the shift maps for automatic transmission AT as compared to Embodiment 1 in which the same maps were used for the EV mode and the HEV mode as the shift maps for automatic transmission AT. With the exception of the target automatic transmission shift calculation for step S403 performed by operating point command unit 400 shown in FIG. 6, the steps for Embodiment 2 are the same as those for Embodiment 1, so an explanation and illustration has been omitted.

Figure 14:
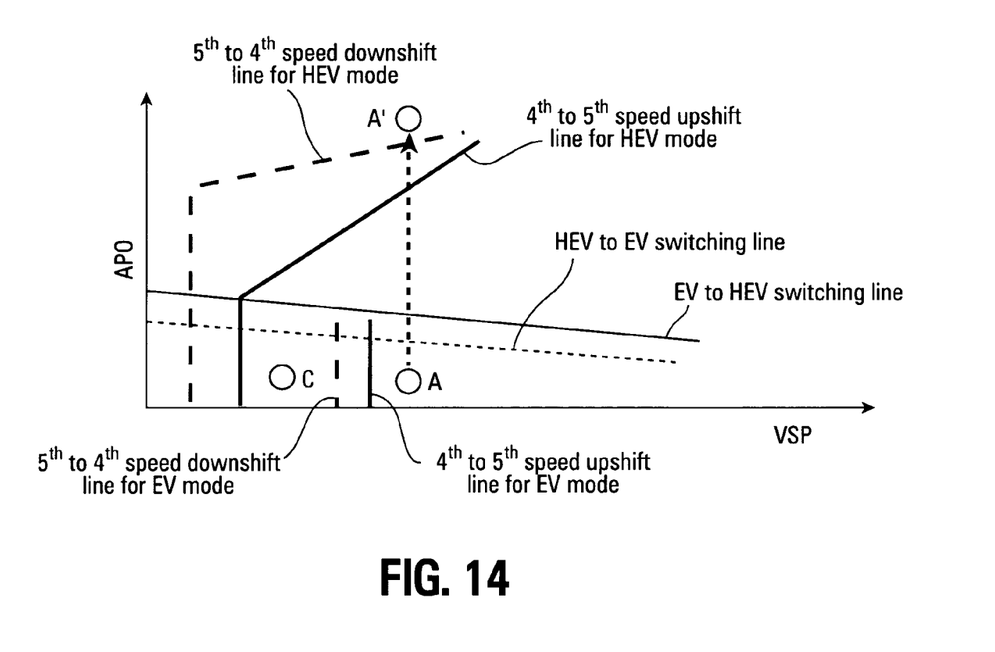
FIG. 14 is a diagram showing one example of the operation point map for when a request is made for an upshift when the target mode set at the mode-setting step shown in FIG. 6 transitions from the EV mode to the HEV mode in relation to the engine starting control device pertaining to Embodiment 2.

At step S403, when the target mode is the HEV mode, the target automatic transmission shift is calculated from the accelerator pedal opening APO and the vehicle speed VSP using the shift map shown in FIG. 7. In addition, as shown in FIG. 14, from the standpoint of the efficiency in the EV mode and the efficiency in the HEV mode, the upshift and downshift lines for when the target mode is in the EV mode are set more towards the high vehicle speed side than the upshift and downshift lines for the HEV mode. However, the target automatic transmission gear ratio is set so that the automatic transmission input rotation speed at the current vehicle speed is higher than the rotation speed that is possible for engine operation.

FIG. 14 shows an example of the upshift line from the $4^{th}$ speed to the $5^{th}$ speed and the downshift line from the $5^{th}$ speed to the $4^{th}$ speed. When operating at the $5^{th}$ speed in the EV mode and changing the accelerator pedal opening from point A to point A', which cross over the downshift line, the engine is started in conjunction with the downshift. On the other hand, when operating at a lower vehicle speed than the downshift line in the EV mode, or at a higher vehicle speed than the upshift line in the HEV mode, such as point C, and the target mode becomes the HEV mode due to a decrease in the battery SOC when operating at the $4^{th}$ speed in the EV mode, the engine is started in conjunction with an upshift from the $4^{th}$ speed to the $5^{th}$ speed.

Next, is provided an explanation of the operation. For the engine starting control means for the engine starting control device pertaining to Embodiment 2, the upshift line and downshift line for when the target mode is the EV mode are set more toward the high vehicle speed side than the upshift line and downshift line for when the target mode is the HEV mode in relation to the shift map for the automatic transmission AT.

Therefore, the vehicle operating point does not change while operating in the EV mode, so when a mode transition request to transition to the HEV mode due to a decrease in the battery SOC is made, the engine can be started in conjunction with the upshift request, so the engine can be started in conjunction with an upshift request more frequently and more aggressively than was the case for Embodiment 1, the rotational difference in first clutch CL1 that takes place when lift-starting engine E can be reduced, and the deterioration of the durability of the clutch can be effectively suppressed. The rest of the operation is the same as those described for Embodiment 1, so further explanation has been omitted.

Next is provided an explanation of the effects. In addition to the effects described in numbers (1) through (7) for Embodiment 1, the effect described below can also be achieved for the engine starting control device for a hybrid vehicle pertaining to Embodiment 2.

(8) For the aforementioned engine starting control means, since the upshift line and downshift line for when the target mode is the EV mode are set more toward the high vehicle speed side than the upshift line and downshift line for when the target mode is the HEV mode in relation to the shift map for the automatic transmission AT, the vehicle operating point does not change while operating in the EV mode, so when a mode transition request to transition to the HEV mode due to a decrease in the battery SOC is made, the engine can be started in conjunction with an upshift request more frequently and more aggressively than was the case for Embodiment 1, the rotational difference in first clutch CL1 that takes place when lift-starting engine E can be reduced, and the deterioration of the durability of the clutch can be effectively suppressed.

Explanation has been provided for the engine starting control device for a hybrid vehicle based on Embodiments 1 and 2, but the specific constitution is not limited to these embodiments, and modifications and additions may be made to the design as long as they do not deviate from the gist of the invention pertaining the scope of claims for the present patent.

For Embodiment 1, an automatic transmission that changes the gearshift ratio in steps was used as an example for the transmission, but a continuously variable transmission in which the gearshift ratio is continuously changed may also be used. In such a case, the engine starting control means performs control to change the gearshift ratio to the upshift side or the downshift side, including making no change in the gearshift ratio, so that the transmission input rotation speed coincides with a target rotation speed that is the same or more than the rotation speed possible for engine operation when transitioning modes to the HEV mode while operating in the EV mode. So, in essence, if the engine starting control means controls the gearshift ratio of the transmission so that the transmission input rotation speed becomes closer to the rotation speed that is possible for engine operation within a range in which the transmission input rotation speed becomes the same or more than the rotation speed that is possible for engine operation in accordance with a system request that is made while operating in the EV mode and switching modes to the HEV mode, the means is not limited to Embodiment 1 or 2.

Embodiments 1 and 2 are examples of the application of the present invention to a rear-wheel drive hybrid vehicle, but it is also applicable to a front-wheel drive hybrid vehicle or a four-wheel drive hybrid vehicle. Embodiments 1 and 2 are also examples in which a clutch that was housed inside of the automatic transmission was used as the second clutch, but a second clutch may be added and disposed between the motor/generator and the transmission or added and disposed between the transmission and drive wheels (for example, Japanese Unexamined Patent Application Publication No. 2002-144921). So, in essence, the present invention can be applied to a hybrid vehicle that comprises a hybrid drive system in which a first clutch has an adjustable torque capacity is disposed between the engine and the motor/generator and a transmission that changes the gearshift ratio continuously or in steps is disposed between the motor/generator and the drive wheels.

What is claimed is:

1. A drive device for a hybrid vehicle, comprising:
   an engine;
   a motor/generator;
   a first clutch disposed between the engine and the motor/generator having an adjustable torque capacity;
   a transmission disposed between the motor/generator and drive wheels of the hybrid vehicle that can change a gearshift ratio continuously or in steps; and
   a control system that can control the engine, the motor/generator, the first clutch, and the transmission;
   wherein the control system comprises a controller adapted to engage the first clutch from a released state and lift-start the engine when there is a request to switch to a hybrid operation mode from an electric operation mode; and
   wherein lift-starting the engine, performed according to the controller, comprises adjusting a transmission input rotation speed by controlling a gearshift ratio of the transmission and engaging the first clutch after starting the adjusting when there exists both an upshift command for the transmission and the request to switch to the hybrid operation mode from the electric operation mode; and
   wherein lift-starting the engine, performed according to the controller, comprises engaging the first clutch and adjusting a transmission input rotation speed by controlling a gearshift ratio of the transmission after engaging the first clutch when there exists both a downshift command for the transmission and the request to switch to the hybrid operation mode from the electric operation mode.

2. The drive device for a hybrid vehicle according to claim 1, wherein lift-starting of the engine, performed according to the controller, reduces the transmission input rotation speed to a speed that is equal to or greater than a rotation speed that is possible to start the engine.

3. The drive device for a hybrid vehicle according to claim 1, wherein the controller up shifts the transmission and then completes the engagement of the first clutch while operating in the electric operation mode.

4. The drive device for a hybrid vehicle according to claim 1, wherein the controller compensates for a drag torque of the first clutch using the motor/generator when lift-starting the engine.

5. The drive device for a hybrid vehicle according to claim 1, wherein the controller further comprises a shift map showing a relationship between a gear shift and an operating state of the vehicle in which an upshift line and a downshift line, when a target mode is the electric operation mode, are set more toward the high vehicle speed side than the upshift line and downshift line for when the target mode is the hybrid operation mode in relation to the shift map.

6. The drive device for a hybrid vehicle according to claim 1, wherein the drive device for the hybrid vehicle comprises a second clutch disposed between the motor/generator and the transmission that can change a transfer torque capacity.

7. The drive device for a hybrid vehicle according to claim 1, wherein the drive device for the hybrid vehicle comprises a second clutch disposed between the transmission and drive wheels of the hybrid vehicle that can change a transfer torque capacity.

8. The drive device for a hybrid vehicle according to claim 3, wherein the controller raises a torque of the motor/generator in accordance with the upshift.

9. A drive device for a hybrid vehicle, comprising:
an engine;
a motor/generator;
a first clutch disposed between the engine and the motor/generator having an adjustable torque capacity;
a transmission disposed between the motor/generator and drive wheels of the hybrid vehicle that can change a gearshift ratio continuously or in steps; and
a control system that can control the engine, the motor/generator, the first clutch, and the transmission;
wherein the control system comprises a controller adapted to engage the first clutch from a released state and lift-start the engine when there is a gear shift request and when there is a request to switch to a hybrid operation mode from an electric operation mode; and
wherein lift-starting the engine, performed according to the controller, comprises:
engaging the first clutch before a gear shift when a transmission input rotation speed before the gear shift is lower than the transmission input rotation speed after the gear shift; and
engaging the first clutch after the gear shift when the transmission input rotation speed before the gear shift is higher than the transmission input rotation speed after the gear shift.

10. The drive device for a hybrid vehicle according to claim 9, wherein the controller completes an upshift of the transmission in conjunction with an upshift request while operating in the electric operation mode, and then engages the first clutch and lift-starts the engine a drag torque of the first clutch.

11. The drive device for a hybrid vehicle according to claim 9, wherein the controller completes the lift-start of the engine while using a drag torque of the first clutch in conjunction with a downshift request while operating in the electric operation mode, and then starts the downshift of the transmission.

12. The drive device for a hybrid vehicle according to claim 9, wherein the controller compensates for a drag torque of the first clutch by using the motor/generator when lift-starting the engine.

13. The drive device for a hybrid vehicle according to claim 9, wherein the controller further comprises a shift map showing a relationship between a gear shift and an operating state of the vehicle in which an upshift line and a downshift line for when a target mode is the electric operation mode are set more toward a high vehicle speed side than the upshift line and downshift line for when the target mode is the hybrid operation mode in relation to the shift map.

14. The drive device for a hybrid vehicle according to claim 9, wherein the drive device for the hybrid vehicle comprises a second clutch disposed between the motor/generator and the transmission that can change a transfer torque capacity.

15. The drive device for a hybrid vehicle according to claim 9, wherein the drive device for the hybrid vehicle comprises a second clutch disposed between the transmission and drive wheels of the hybrid vehicle that can change a transfer torque capacity.

16. The drive device for a hybrid vehicle according to claim 10, wherein lift-starting the engine, performed according to the controller, upshifts so that the transmission input rotation speed is in a range that is the same or more than the rotation speed that is possible to start the engine.

17. The drive device for a hybrid vehicle according to claim 10, wherein the controller raises a torque of the motor/generator in accordance with the upshift.

* * * * *